United States Patent [19]

Ayala-Ortiz

[11] Patent Number: 4,682,998
[45] Date of Patent: Jul. 28, 1987

[54] ELECTRONIC SYSTEM FOR AUTOMATICALLY CONTROLLING THE WEIGHT OF GLASS GOBS IN A MOLTEN GLASS FEEDER

[75] Inventor: Ignacio L. Ayala-Ortiz, Garza Garcia, Mexico

[73] Assignee: Vitro Tec Fideicomiso, Monterrey, Mexico

[21] Appl. No.: 905,710

[22] Filed: Sep. 9, 1986

[30] Foreign Application Priority Data

Sep. 9, 1985 [MX] Mexico .................................. 206561

[51] Int. Cl.⁴ ............................................... C03B 7/08
[52] U.S. Cl. ........................................ 65/164; 65/162; 65/330; 65/331; 65/DIG. 13
[58] Field of Search ................. 65/330, 331, 160, 162, 65/164, DIG. 13

[56] References Cited

U.S. PATENT DOCUMENTS

| | | | |
|---|---|---|---|
| 2,306,789 | 12/1942 | McNamara | 65/164 X |
| 3,239,326 | 3/1966 | Tyner | 65/330 |
| 3,846,107 | 11/1974 | Foster et al. | 65/164 |
| 3,874,866 | 4/1975 | Iacovazzi et al. | 65/164 |
| 4,122,940 | 10/1978 | Hoffmann | 65/160 X |
| 4,369,053 | 1/1983 | Becker et al. | 65/330 X |
| 4,551,163 | 11/1985 | Duga et al. | 65/164 X |

Primary Examiner—Arthur Kellogg
Attorney, Agent, or Firm—Abelman Frayne Rezac & Schwab

[57] ABSTRACT

An electronic system for automatically controlling the weight of glass gobs in a molten glass feeder, through the regulation of the height of the rotatory tube with respect to the feeder orifice; the electronic system includes, in combination, a finished article, a weight detector, a tube position detector attached to said tube, at least a temperature detector and glass level detector at the feeder, each of which respectively providing signals representative of the weight of the finished article, of the height of the tube with respect to the feeder orifice, of the molten glass temperature in said feeder and of the glass level in the same; a data processor which receives and processes the signals of the detectors, in order to compare the weight of the finished articles with a predetermined weight for the same and relates the weight deviations with the temperature and level of the glass and the height of the tube, in order to provide synergistic tube height compensation signals in order to allow an adequate flow of glass to pass between said tube and the feeder orifice and so obtain the predetermined article weight; and an operator panel interconnected with the data processor in order to obtain and provide data therefrom.

6 Claims, 4 Drawing Figures

ELECTRONIC SYSTEM FOR AUTOMATICALLY CONTROLLING THE WEIGHT OF GLASS GOBS IN A MOLTEN GLASS FEEDER

FIELD OF THE INVENTION

The present invention is related to glassware article forming machines of the multiple section type such as those known as I.S. or of the rotatory type such as those known as Lynch, and more specifically, the invention relates to molten glass feeders, for the mentioned machines or others which may require them.

BACKGROUND OF THE INVENTION

The automatic fabrication of glass articles is carried out by means of glass forming machines such as those of multiple sections known as I.S. glassware forming machines, or the rotatory type known as Lynch and through forming processes known as blow and blow, press and blow or press.

For the manufacture of glassware articles, it is necessary to feed molten glass gobs towards the machine. The mentioned molten glass gobs are obtained from a feeder that is a part of a glass melting furnace.

A molten glass feeder generally includes a feeder bowl defining an outlet spout; a plate having feeding orifices is placed adjacent to said spout, through which flows a discharge of molten glass; a rotating tube in the bowl perpendicularly aligned with the spout, is mounted on a mechanism that controls its rotation and height with respect to said spout in order to homogenize the glass in said feeder bowl and regulate the passage of the glass towards the orifice; a reciprocating plunger into the tube and aligned with the orifice and which is mounted on a reciprocating mechanism which imparts and controls its reciprocating run in order to push out a predetermined amount of glass towards the orifice; and a pair of reciprocating shear blades opposite to each other, placed under the orifice, and mounted on their respective reciprocating mechanisms in order to cut off the glass gobs from the flow of glass that comes out of the orifice.

Regularly said tube is the element which controls the amount of glass that should come out from the orifice and which is to be cut off by means of the shear blades in order to provide the glass gobs having the required weight to manufacture an article of predetermined weight.

However, the real weight similar to the predetermined weight is not always achieved because of disarrangements in the height of the tube which affect the weight of the gobs and of the articles.

In order to achieve a control on the weight of the glass gobs and of the finished articles the U.S. Pat. No. 2,306,789 of W. L. Mc. Namara describes an automatic electromechanical regulator used to control the weight of the gobs, which includes a scale to weigh the finished articles, which provides a representative signal of the weight to elements which respond to the same and which operate an electric motor that is connected to the tube mechanism in order to regulate the height of the tube with respect to the orifice.

After the aforementioned patent a series of mechanisms appeared in order to control the height of the tube, such as those described by the U.S. Pat. Nos. 2,479,121 of M. K. Koleda, 3,239,326 of R. E. Tyner and 3,874,866 of Iacovazzi et al, as well as diverse forms for weighting the finished articles or the glass gobs, such as those described by the U.S. Pat. Nos. 3,846,107 of T. V. Foster et al. 4,339,028 of T. Meacle and 4,165,975 of Kwiatkowsk et al.

Trying to achieve a more precise control on the weight of the gobs and the articles, other control systems arouse which detect the volume of the gob through several form detecting chambers, placed at 90 degrees to each other such as the one described by the U.S. Pat. No. 4,205,973 of W. H. Ryan.

However, even though a better control of the height of the tube by means of measuring its weight or volume is already had, there still subsists the problems about lack of adjustment in the weight of the gob. The latter is so because, up to now, there was no knowledge about the dynamic process of the system that includes the tube movement nor this had been taken into account. The mentioned movement introduced a strong tendency to unstably the control of the system.

The latter permitted the inventor of the present invention to determine that the conditions which upset the desired weight of the glass gobs are the following:

1. The temperature, homogeneity and viscosity of the molten glass;
2. The level of the glass in the feeder bowl which exerts a load on the orifice zone;
3. The wear of the orifice through which the glass flow comes out; and
4. The disarrangements in the tube mechanism.

Having thus determined the variables that affect the system, the inventor of the present invention designed an electronic system in order to automatically control the weight of the glass gobs, in which through the continuous monitoring of the weight of the finished articles, of the height of the tube with respect to the orifice and of the temperature and level of the glass in the feeder bowl, through adequate detectors, and by means of a data processor which compares the real weight of the articles with the predetermined weight of the same, and relates the weight deviations with the height of the tube and the temperature and level of the glass in the feeder bowl, provides a compensation for variations in the height of the tube in order to permit the adequate passage of glass between the mentioned tube and the orifice achieving in this wax the predetermined weight for the articles.

SUMMARY OF THE INVENTION

An object of the present invention is to provide an electronic system for automatically controlling the weight of glass gobs in a molten glass feeder which considers the dynamic process of the system in order to control the height of the tube so that it can provide glass gobs and glass articles with the required weight.

It is likewise a principal object of the present invention to provide an electronic system of the previously described characteristics which continuously monitors the weight of the finished articles and compares the weight with the predetermined weight deviations with the height of the tube and with the temperature and level of the molten glass in the feeder bowl, in order to affect the adjustments and compensations to the tube height in order to achieve the predetermined weight of the glass gobs and glass finished articles.

It is still another main objective of the present invention to provide an electronic system, of the previously described nature, which includes article weight detectors, of the position of the tube, and of the temperature and level of the molten glass in the feeder bowl, in order to provide signals representative of the variables they detect; and a data processor unit, which receives and processes the signals from the detectors in order to provide a synergistic signal that controls and compensate the tube height in order to achieve the desired weight for the glass gobs and for the finished glass articles; and an operator panel.

It is yet another main objective of the present invention to provide an electronic control system, of the nature previously described, which is capable of reducing the standard deviation of the glass gob weight to less than 0.1 grams of the assigned weight; which has the capacity to react to changes that were previously determined without provoking instability of the system; which has an answer time to a 50 grams step which is less than one minute; which is based on digital discrete components which reduce the sensitivity to noxious environmental noises; and which has a permanent memory which includes the processes and a self adjustable control algorithm.

These and other objectives and advantages of the present invention will become evident to the skilled in the field from the following detailed description, which is provided with respect to a specific embodiment in the understanding that the same is only of an illustrative type but does not limit the scope of the invention.

DETAILED DESCRIPTION OF THE INVENTION

Now follows a description of the invention referring to the attached drawings as an illustration thereof and numbers and symbols refer to the same parts on the shown figures.

Figure 1:
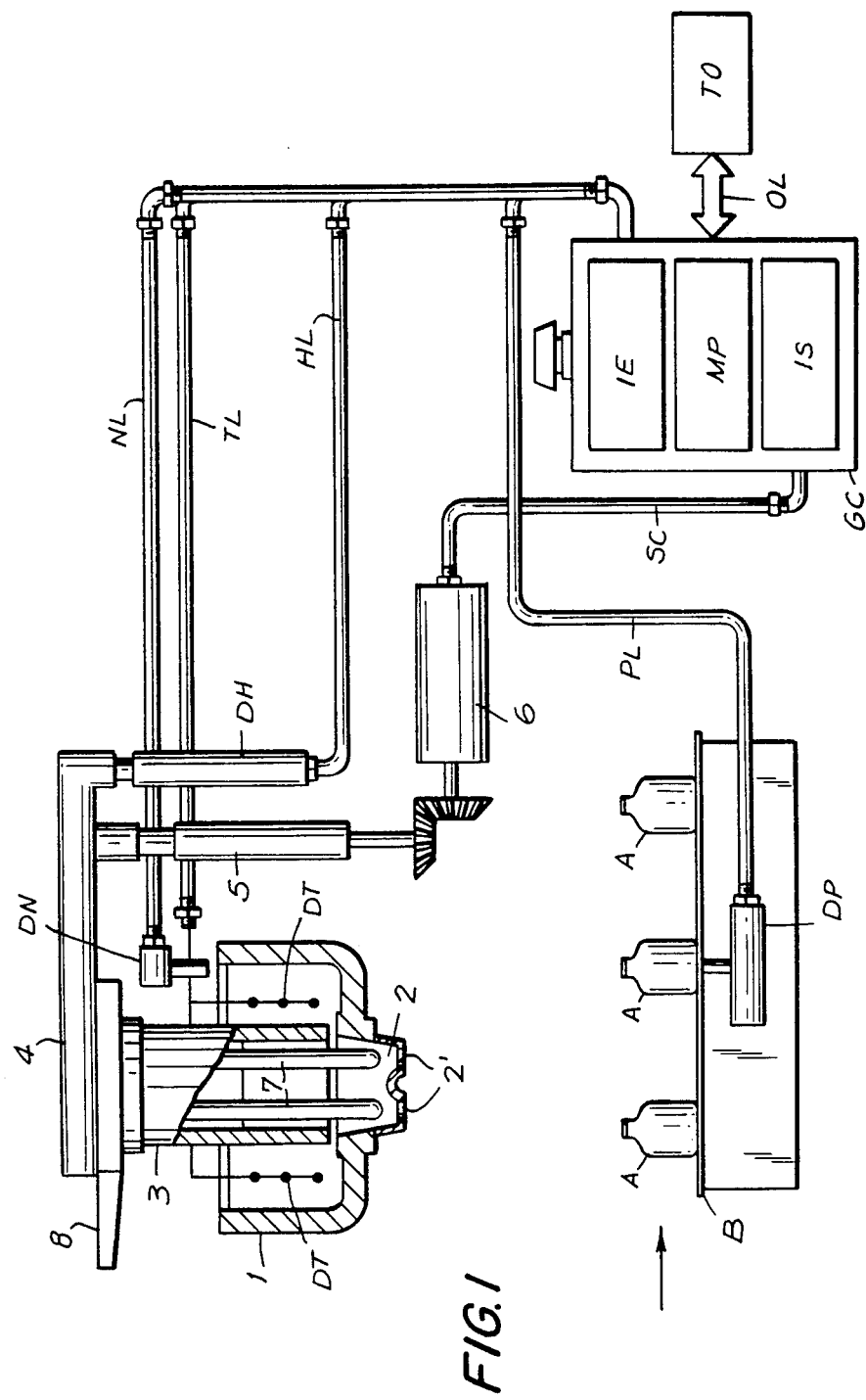
FIG. 1 is a diagram of the electronic system of the present invention, showing all of its components and a cross section view of the feeder.

Referring to FIG. 1, the molten glass feeder as is shown in the same, generally includes a feeder bowl 1, which has an orifice-plate 2 at the end of the feeder bowl 1 with two orifices 2' for glassware forming machines that include a double cavity (not shown) through which a flow of molten glass comes out and which is cut off by means of a pair of reciprocal blades opposed to each other (not shown); a rotating tube 3 mounted on a mechanism 4 which makes it rotate and which includes a mechanism 5 to lift and lower the tube 3 with respect to the orifice 2; and a pair of reciprocating plungers 7 mounted on a reciprocating mechanism 8, which is aligned with the orifices 2' of the orifice-plate 2 in order to push out the glass toward the exit orifices 2' thus providing two flows of molten glass to be cut off in gobs by the blades (not shown).

FIG. 1 also shows the electronic system that automatically controls the weight of the glass gobs in the described feeder. The system basically includes, in combination: a DP scale located at one side of conveyor belt B, which weights the finished articles A and which provides a signal representative of the weight of the articles A through a PL line; a position detector DH attached to the mechanism 5 of the tube 3 in order to provide a signal representative the height of the tube 3 with respect to the orifice 2, said signal is sent through an HL line; thermopars DT placed inside feeder bowl 1 which provide signals representative of the temperature of the molten glass, this signal is sent through a TL line; a level detector DN placed next to the upper end of the feeder bowl 1 in order to provide a signal representative of the level of the glass in the feeder bowl 1, this signal is sent through a NL line; a microprocessor MP which receives, through its input interfaces IE, the signals from the weight detector DP, the position detector DH, the temperature detector DT and the level detector DN, transmitted through their respective PL, HL, TL, and NL lines; in order for microprocessor MP to processes the said signals and to compare the actual weight of the finished articles with the required weight for the same and relates the weight deviations with the height of tube 3 with respect to the orifice 2, the temperature and the level of the molten glass in the feeder bowl, in order to provide synergetic height compensation signals for the tube 3, through its output interfaces IS and SC line in order to activate motor 6 and the tube mechanism 5 to permit the passage of the required glass weight towards orifice 2 and its two outlets 2 and 2' and achieve the predetermined and required weight for the article; and an operator panel TO which is connected to the microprocessor MP through a bidirectional line OL in order to feed and obtain information to and from the microprocessor.

The programming of the microprocessor, which is found in its permanent memory, is constituted by routines and protocols in order to coordinate the activities of the operator panel TO and also to coordinate the internal activities of the system. The algorithms are made up by data capturing routines of sensorial information and they also generate the synergetic control signals.

Figure 2:
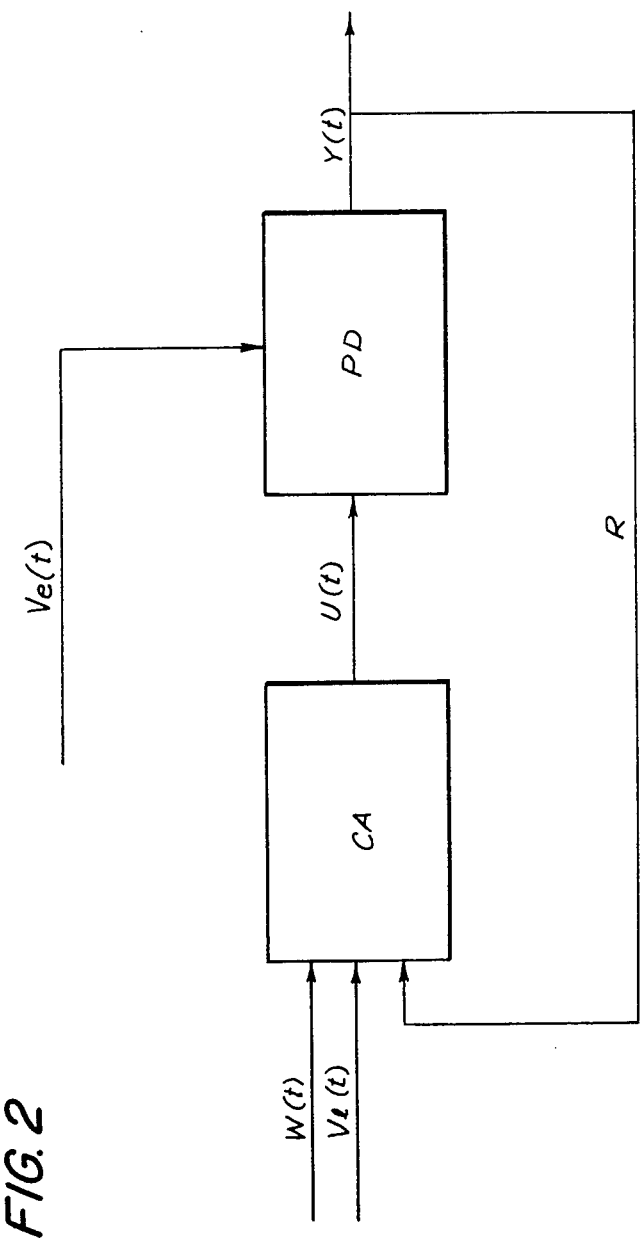
FIG. 2 is a functional diagram of the system of FIG. 1 which shows the processing of the signals that take part in the same.

FIG. 2, shows a functional diagram which places the control algorithm with respect to the process. The outstanding variables of the system are the following: the controlled variable Y(t) which represents the weight of the gob; the manipulated variable U(t) which represents the signal that orders the movement of the tube; the watchword W(t) which represents the desired gob weight; the disturbances Ve(t) which represent the observable conditions which affect the weight of the gob; and the disturbances Ve(t) of the process pre-feeding.

Just as is shown in the stated FIG. 2, the watchword W(t) and the disturbances Ve(t) go into the automatic control system CA where from the manipulated variable comes out V(t) towards the dosification process PD which is receiving the Ve(t) disturbances, which provide the controlled variable Y(t) which is feedback to the control CA through the feedback line R.

Figure 3:
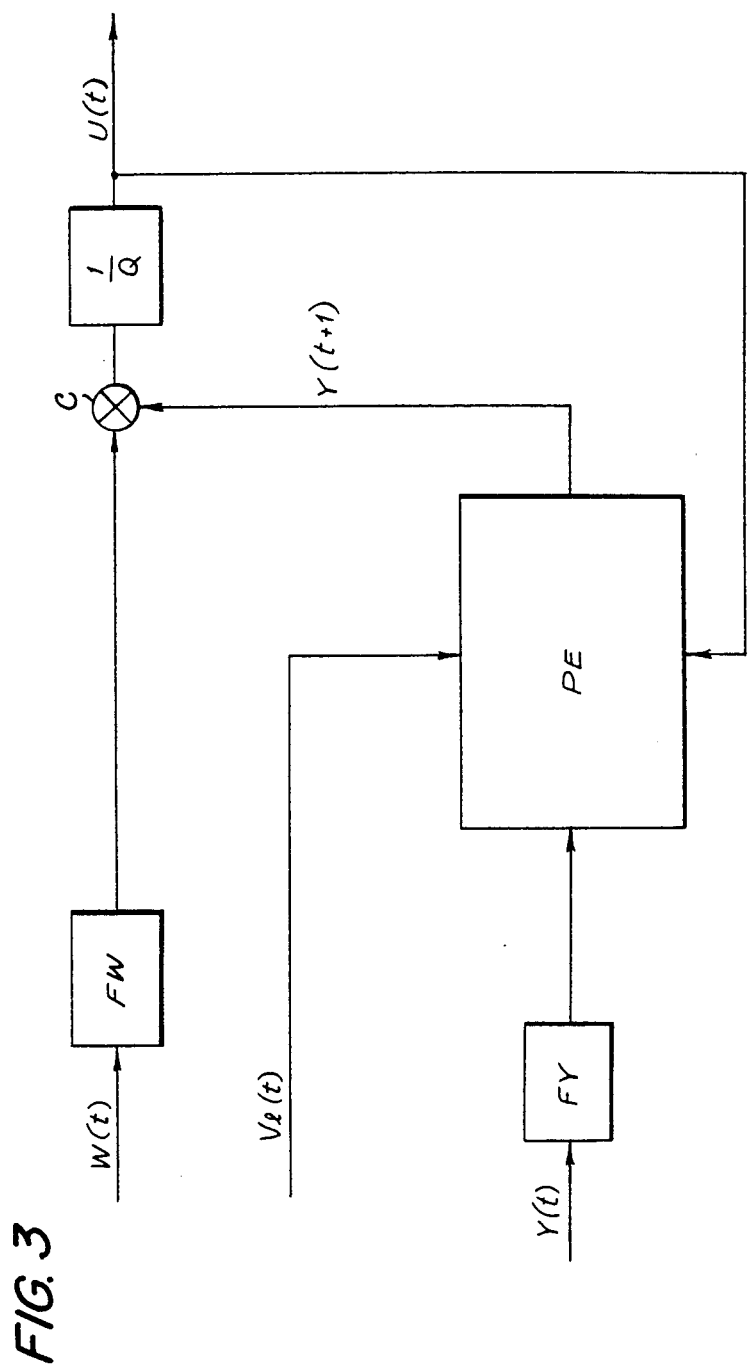
FIG. 3 is a diagram of the algorithm of the electronic control system wherein is located the estimate/forecast of the process.

FIG. 3 shows in detail the control algorithm wherein the glass weight forecast Y(t+1) provided by the forecasting/estimating algorithm PE through a switch C and a recursive filter I/Q, as well as the watchword W(t) that is desired for the gob, through its digital filter FW and the switch C, are incorporated into the control signal or manipulated variable V(t). The forecasting/estimating algorithm receives the disturbances Ve(t) as well as the controlled variable Y(t) through its digital filter FY.

Figure 4:
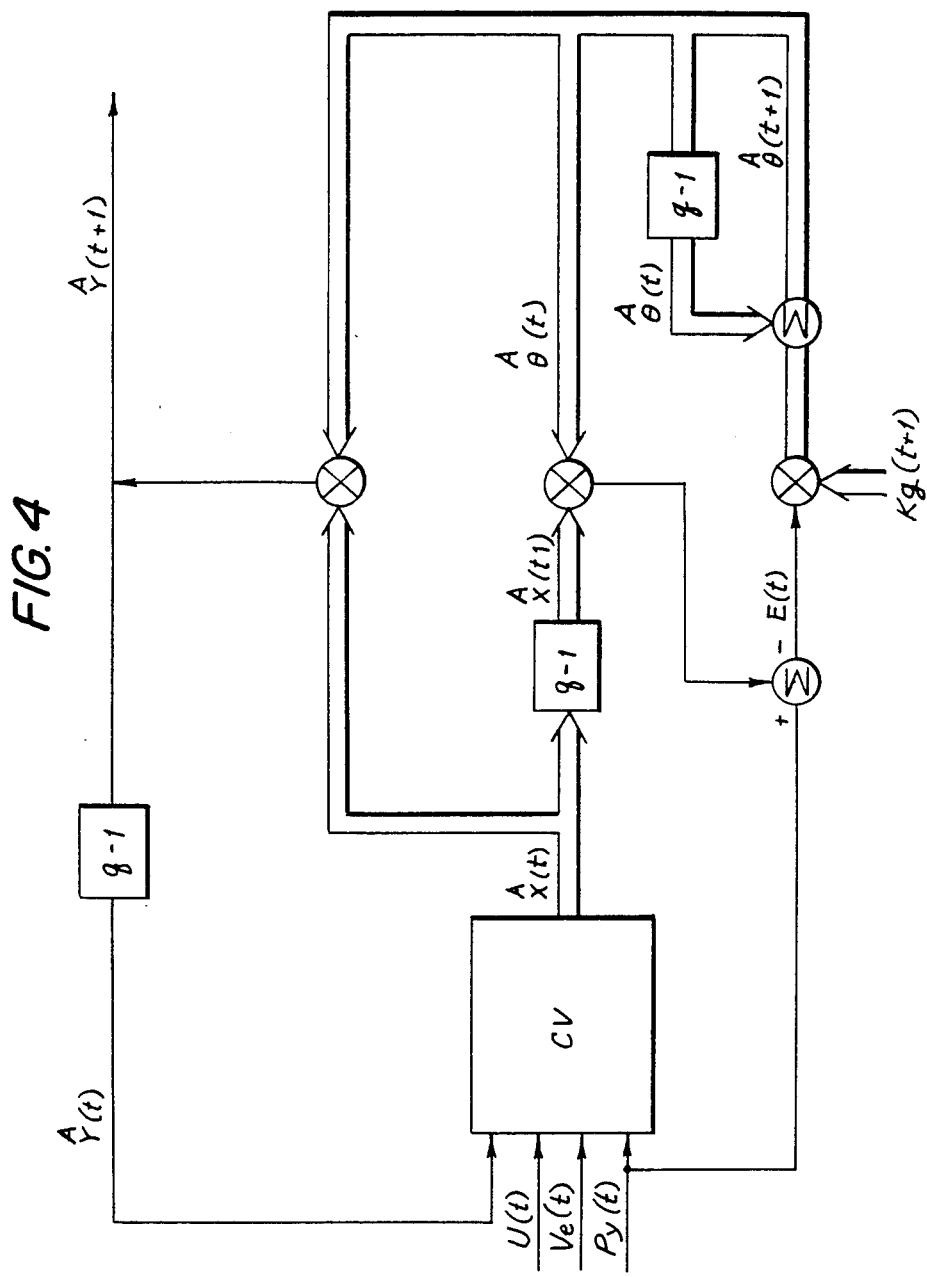
FIG. 4 is an operation flow diagram in order to generate the weight forecasts and the estimates of the parameters of the process.

The flow diagram of FIG. 4 represents the main activities in the generation of the weight forecast Y(t−1), in a vectorial composition CV.

The goodness of the control is based on how much the measurement of the forecast Y(t+1) is kept near to the watchword W(t), which is precisely the key precept of the invention since the more information is located in the structure of the forecast Y(t+1) the less is the statistical difference between Y(t+1) and the watchword U(t).

Formally the forecast Y(t+1) is a lineal combination of the processes variables, X(t), considered by the parameters B(t) which are the system models. The process variable X(t) are the conditions in the present time and in the past such as the control signal in previous time U(t−1), weight measurements Y(t), disturbances in the system VL(t) and even previous weight forecasts Y(t−1).

The estimates B(t) of the system parameters, are recursively generated. It is a self-adjustable dynamic process which periodically corrects itself without external intervention. As the forecast Y(t+1) comes near to the weight measurement Y(T), the parameters B(t) converge likewise in the system modeling. Unfortunately there are mutable factors that notably affect the relation between the conditions of the process and the weight of the gob. This necessarily obligates that the estimation process be reactivated periodically to update the modeling of the parameters in agreement with the system prevailing conditions.

I claim:

1. An electronic system for automatically controlling the weight of the glass gobs in a molten glass feeder of the type which includes, a feeder bowl which has feeder orifice; a rotating tube in the feeder bowl, aligned with the orifice and mounted on a mechanism that controls its rotation and height with respect to the orifice, in order to homogenize the glass in the feeder bowl and regulate the passage of the glass toward the orifice; at least a reciprocating plunger in the tube which is aligned with the orifice and mounted on a reciprocating mechanism which imparts and controls its reciprocating movement in order to push out a predetermined amount of glass toward the orifice; and at least a pair of reciprocating blades placed facing each other underneath the orifice and mounted on a reciprocating mechanism for cutting the glass gobs off the glass flow that comes out from the orificen and wherein the system comprising: a weight detector, a tube position detector coupled to said tube, and a temperature detector and a glass level detector placed at the feeder bowl, all of which provide representative signals of the weight of the finished articles, of the height of the tube with respect to the orifice, of the glass temperature and of the level of the glass in the feeder bowl; a data processor which receives and processes the signals of the detectors in order to compare the weight of the finished articles with the predetermined weight for the same and relate the weight deviations with the temperature, the glass level and the height of the tube, so as to provide height compensation signals to the tube mechanism in order to permit the adequate passage of the glass toward the orifice in order to obtain the predetermined weight for the articles; and an operator panel interconnected with the data processor in order to provide and obtain the information from the same.

2. The electronic system of the claim 1, wherein the weight detector is a scale located at a side of a conveyor belt which carries the finished articles.

3. The electronic system of the claim 1, wherein the position detector is a detector of the height of the tube that is attached to a mechanism that controls the rotation and the height of the tube.

4. The electronic system of the claim 1, wherein the temperature detector is at least one thermopar placed at the feeder bowl, next to the orifice.

5. The electronic system of the claim 1, wherein the control panel of the operator comprises a plurality of switches and displays in order to provide and take operation data from the data processor.

6. The electronic system of the claim 1, wherein the data processor is a microcomputer which includes interfaces for the adaptation of the input and output signals, and permanent or volatile memories which include the system operation algorithm of the system.

* * * * *